United States Patent
Zielinski et al.

(10) Patent No.: US 10,260,539 B2
(45) Date of Patent: *Apr. 16, 2019

(54) CONNECTIONS WITH SELECTIVELY VARIABLE DAMPENING CHARACTERISTICS

(71) Applicant: Toyota Motor Engineering & Manufacturing North America, Inc., Erlanger, KY (US)

(72) Inventors: Eric J. Zielinski, Plymouth, MI (US); Allan A. Pett, Farmington Hills, MI (US); Eric M. Ehlert, Taylor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 529 days.

This patent is subject to a terminal disclaimer.

(21) Appl. No.: 14/825,374

(22) Filed: Aug. 13, 2015

(65) Prior Publication Data

US 2017/0045110 A1     Feb. 16, 2017

(51) Int. Cl.
*F16B 43/00*     (2006.01)
*F16B 5/02*     (2006.01)
(Continued)

(52) U.S. Cl.
CPC .......... *F16B 5/0241* (2013.01); *F16B 31/043* (2013.01); *F16F 1/38* (2013.01);
(Continued)

(58) Field of Classification Search
CPC .............. Y10T 29/49766; F16F 15/023; F16F 2230/0041; F16B 39/26; F16B 1/00;
(Continued)

(56) References Cited

U.S. PATENT DOCUMENTS

| | | | | |
|---|---|---|---|---|
| 4,854,798 A | * | 8/1989 | Snyder | F16B 31/043 254/29 A |
| 5,468,106 A | * | 11/1995 | Percival-Smith | B25B 29/02 277/649 |

(Continued)

FOREIGN PATENT DOCUMENTS

WO     2014027080 A1     2/2014

OTHER PUBLICATIONS

Jee et al.; "The Application of the Simulation Techniques to Reduce the Noise and Vibration in Vehicle Development"; Seoul 2000 FISITA World Automotive Congress; Jun. 12-15, 2000; pp. 1-7 (7 pages).

*Primary Examiner* — Sarang Afzali
*Assistant Examiner* — Ruth G Hidalgo-Hernandez
(74) *Attorney, Agent, or Firm* — Christopher G. Darrow; Darrow Mustafa PC (57) ABSTRACT

Two or more vehicle components can be operatively connected with one or more fasteners configured to provide selectively variable dampening characteristics. The fastener can include a dampening unit configured to provide different dampening characteristics based on a torque applied to the fastener. In one or more arrangements, the dampening unit can provide different dampening characteristics based on an amount of compression the dampening unit is under. Target dampening characteristics between two or more components can be determined. A torque can be determined and applied to the fastener based on the target dampening characteristics. The torque can cause the dampening unit of the fastener to compress and provide the target dampening characteristics between the components.

10 Claims, 6 Drawing Sheets

(51) Int. Cl.
*F16F 15/023* (2006.01)
*F16B 31/04* (2006.01)
*F16F 1/38* (2006.01)

(52) U.S. Cl.
CPC ............ *F16F 15/023* (2013.01); *F16B 43/00* (2013.01); *F16F 2230/0041* (2013.01); *Y10T 29/49766* (2015.01)

(58) Field of Classification Search
CPC ...... F16B 5/0241; F16B 43/00; F16B 31/043; B60R 13/08; B60R 13/0206; B60R 13/02; B60R 2013/0807; B60R 2013/0287
See application file for complete search history.

(56) References Cited

U.S. PATENT DOCUMENTS

| | | |
|---|---|---|
| 5,691,037 A | 11/1997 | McCutcheon et al. |
| 5,734,131 A | 3/1998 | Sakamoto |
| 9,676,346 B2 * | 6/2017 | Zielinski et al. ..... F16B 31/043 254/29 A |
| 2010/0109363 A1 | 5/2010 | Boggess et al. |

* cited by examiner

CONNECTIONS WITH SELECTIVELY VARIABLE DAMPENING CHARACTERISTICS

FIELD

The subject matter described herein relates in general to fasteners and, more particularly, to fasteners including integrated dampening units.

BACKGROUND

Noise, vibration, and harshness (NVH) is the study of the noise and vibration characteristics within vehicles. Noise and vibration can occur due to external sources, such as road or wind characteristics. Noise and vibration can result from internal sources, such as the mechanical movement of vehicle components or sounds emitted by vehicle speakers. The connection of vehicle components can result in the transfer of unwanted sounds, vibrations, or other forces from one component to another. There have been many efforts to reduce the transfer of such unwanted sounds or vibrations.

SUMMARY

In one respect, the subject matter described herein is directed to methods to operatively connect a first component and a second component using a fastener. The methods can include determining a torque to be applied to the fastener based on a target dampening characteristic. The torque can be applied to the fastener. The fastener can include a dampening unit configured to provide selectively variable dampening characteristics.

In another respect, the subject matter described herein is directed to fasteners configured to connect a first component and a second component. The fasteners can include a head, a shaft extending from an underside of the head, and a dampening unit connected to an underside of the head. The dampening unit can be configured to compress between the head and the second component. Furthermore, the dampening unit can be configured to provide dampening characteristics between the first and the second component, and the dampening characteristics can be selectively variable based on a torque applied to the head.

In yet another respect, the subject matter described herein is directed to methods to operatively connect a first component and a second component at a first attachment location and a second attachment location. The methods can include determining a first target dampening characteristic between the first component and the second component at the first attachment location. The methods can also include determining a second target dampening characteristic between the first component and the second component at the second attachment location. A first torque to be applied to a first fastener at the first attachment location can be determined based on the first target dampening characteristics. A second torque to be applied to a second fastener at the second attachment location can be determined based on the second target dampening characteristics. Methods can further include applying the first torque to the first fastener and applying the second torque to the second fastener. The first fastener and the second fastener can include dampening units configured for variable compression between the first component and the second component based on torque applied to the fastener.

DETAILED DESCRIPTION

This detailed description relates to the operative connection of two or more components with fasteners configured to provide target dampening characteristics between the components. Target dampening characteristics can be achieved by using one or more fasteners that include dampening units. The dampening units are configured to provide variable dampening characteristics. In some arrangements, the dampening units can provide variable dampening characteristics based on a torque value applied to the fastener. The amount of torque applied to the fastener can determine the amount of compression applied to the dampening unit. The present detailed description relates to fasteners and associated connecting methods for that incorporate one or more of such features. In at least some instances, such methods can determine torques to be applied to two or more fasteners to achieve target dampening characteristics between two or more components at two or more attachment locations.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
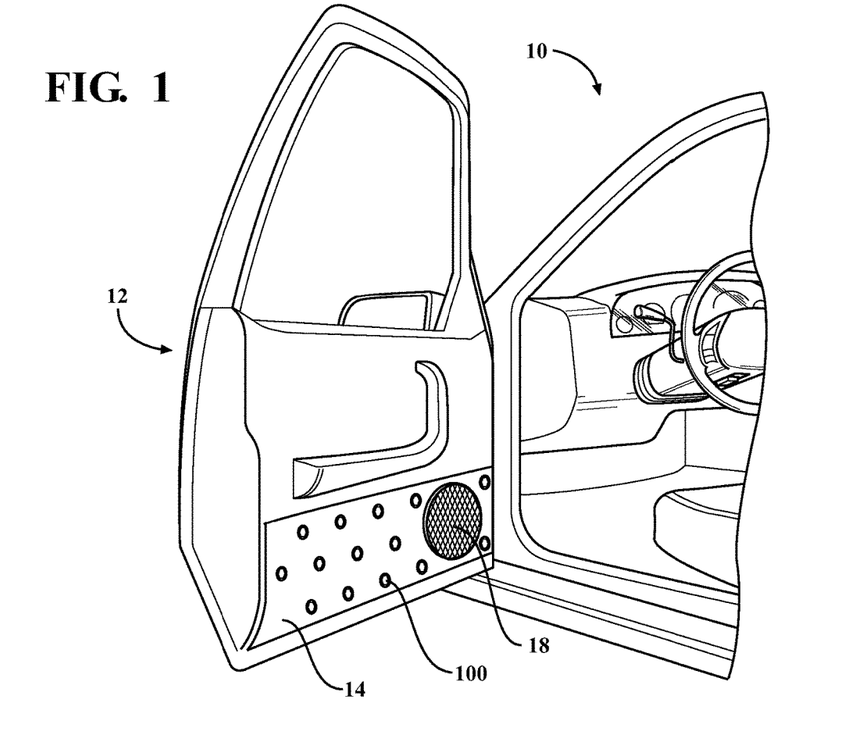
FIG. 1 is an example of a portion of a vehicle.

FIG. 1 is an example of a portion of a vehicle 10. The vehicle 10 includes a door 12. The door including a first component 14 and one or more fasteners 100. As used herein, "vehicle" means any form of motorized transport. In one or more implementations, the vehicle can be an automobile. While arrangements will be described herein with respect to automobile assemblies, it will be understood that embodiments are not limited to automobile assemblies. In some implementations, the vehicle can be a watercraft, an aircraft, a spacecraft, or any other form of transport. In one or more arrangements, the first component 14 can be a trim panel. The first component 14 can be operatively connected to a second component within the door 12 via the fastener 100. The term "operatively connected," as used throughout this description, can include direct or indirect connections, including connections without direct physical contact. As further shown in FIG. 2, the first component 14 can include a speaker 18. The speaker 18 can be any suitable type of speaker. The fasteners 100 can be located at different locations within the first component 14. The fasteners 100 can be distributed on the first components 14 in any suitable manner. For example, fastener 100a can be located closer to the speaker 18 than fastener 100b.

Figure 3:
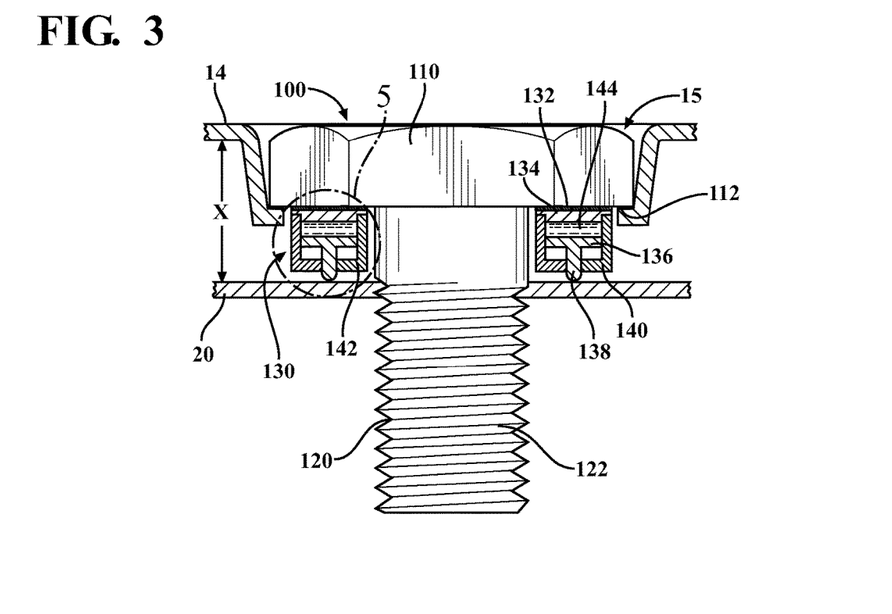
FIG. 3 is a partial cross-sectional view of an example of a fastener including a piston-based dampening unit, the fastener connecting two vehicle components.
Figure 6:
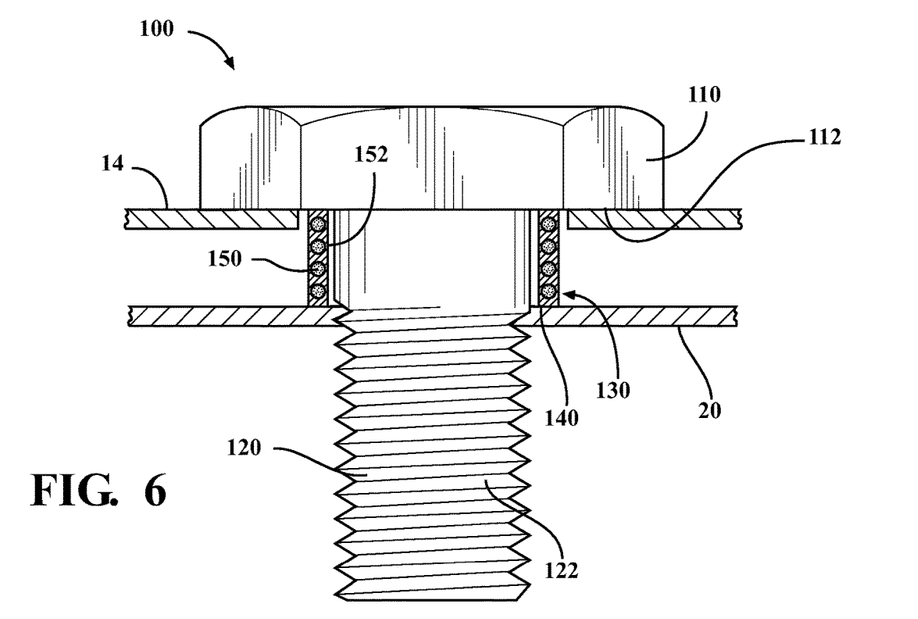
FIG. 6 is a partial cross-sectional view of an example of a fastener including a spring-based variable dampening unit.

In one or more arrangements, one or more of the fasteners 100 described herein can include dampening units 130 (see, e.g., FIGS. 3 and 6). The dampening units 130 can provide variable dampening characteristics. The dampening units 130 can be configured to dampen noise or vibration between two or more components, or otherwise reduce or prevent the transfer of forces from one component to another. As used herein, "dampening characteristics" can include any qualitative or quantitative measurement relating to the ability of a fastener to dampen noise, vibration, and/or forces acting between and/or transferred between two or more components connected by the fastener.

For instance, quantitative measurements of a dampening characteristic can include a dampening coefficient of the dampening unit 130. In one or more arrangements, the dampening characteristics can include other measurements such as the force required to further compress the dampening unit 130 a certain distance. The dampening characteristic can include an amount of relative movement of portions of the dampening unit 130 based on the application of a predetermined force to the fastener 100. Another dampening characteristic can include the space (distance?) between a first component and a second component when connected by a fastener. Dampening characteristics can include a resonance frequency of one or more the components operatively connected by the fastener 100. In one or more arrangements, the dampening characteristics can include an amount of reduction of vibrations between two components. For example, dampening characteristics can include a percentage reduction, from one component to another, of a vibration at a particular frequency.

In one or more arrangements, the dampening characteristics can include qualitative characteristics relating to the fastener 100, the dampening unit 130, the first component 14 and/or the second component 20. For example, the dampening characteristics can include a reduction in sound or vibration from the first component 14 to the second component 20. The elimination or reduction of sounds such as squeaks, clicks, rattles, road noise, and/or wind noise can be dampening characteristics.

FIG. 3 shows an example of the fastener 100 used to operatively connect two or more vehicle components. In one or more arrangements, the first component 14 can be operatively connected to a second component 20. The first component 14 can be operatively connected to the second component 20 via the fastener 100 at one or more attachment locations. In one or more arrangements, the first component 14 can include a recess, bore, depression, or indentation 15 that can allow the fastener 100 to be substantially flush with or recessed from an outer surface of the first component 14. The dampening unit 130 can cause the first component 14 to be spaced from the second component 20 at a distance X, as is shown in FIG. 3. This spacing and the dampening unit 130 can, in some arrangements, prevent the first component 14 and the second component 20 from directly contacting each other. By isolating the first component 14 from the second component 20, the dampening unit 130 can reduce the transmission of noise, vibration, and/or other forces between the first component 14 and the second component 20.

Some of the possible elements of the fastener 100 are shown in FIG. 3 and will now be described. It will be understood that it is not necessary for the fastener 100 to have all of the elements shown in FIG. 3 or described herein. In one or more arrangements, the fastener 100 can include a head 110, a shaft 120, and a dampening unit 130.

In some arrangements, the head 110 of the fastener 100 can be configured to receive an input from and/or to be engaged or manipulated by a tool or operator. For example, the head 110 can be configured to receive a torque application from a tool and/or operator. The head 110 can be sized and/or shaped to engage or to be engaged or manipulated by a tool such as a wrench, screwdriver, or drill bit. For instance, the head 110 can be hexagonally shaped as shown in the Figures. The shaft 120 of the fastener 100 can be threaded along at least a portion of its length. The shaft 120 can include a plurality of threads 122. The threads 122 can be configured to threadably engage the second component 20 and/or other vehicle components. For example, the threads 122 of the shaft 120 can threadably engage a threaded nut (not shown). A torque applied to the head 110 can result in the head 110 moving toward the first component 14 as a rotational force (torque) is transferred to a linear force through the threaded interaction.

The dampening unit 130 can be configured to contact a portion of the fastener 100. For example, in one or more arrangements, the dampening unit 130 can be configured to contact an underside 112 of the head 110 of the fastener 100. The dampening unit 130 can be operatively connected to any suitable portion of the fastener 100. For example, the dampening unit 130 can be operatively connected to the underside 112 of the head 110 of the fastener 100. The dampening unit 130 can be operatively connected to the fastener 100 in any suitable manner. For instance, the dampening unit 130 can be operatively connected to the fastener 100 via an adhesive 132. Alternatively or in addition, the dampening unit 130 can be operatively connected to the underside 112 via one or more clips, fasteners, welding, brazing, tape, mechanical engagement, and/or any other fastening techniques. The term "underside" is used for convenience and is not intended to be limiting. Indeed, depending on the orientation of the fastener 100 in use, the underside may actually be an upper side.

In one or more arrangements, the dampening unit 130 can be a separate unit from the head 110 and the shaft 120. The dampening unit 130 can be configured to contact the head 110 of the fastener 100 at a first end, and the second component 20 at a second end. In one or more arrangements, the fastener 100 is configured to contact the first component 14 at the head 110, and contact the second component 20 at the second end of the dampening unit 130.

The dampening unit 130 can have any suitable shape or configuration. In one or more arrangements, the dampening unit 130 can be annular in shape and extend around the shaft 120. In one or more arrangements, the dampening unit 130 can substantially surround a portion of the shaft 120. The dampening unit 130 can have other shapes and/or configurations. The dampening unit 130 can include one or more individual units. For example, the dampening unit 130 can include two or more units distributed around an outer peripheral surface of the shaft 120. In some arrangements, the dampening unit 130 can extend only partially around the shaft 120.

Figure 4:
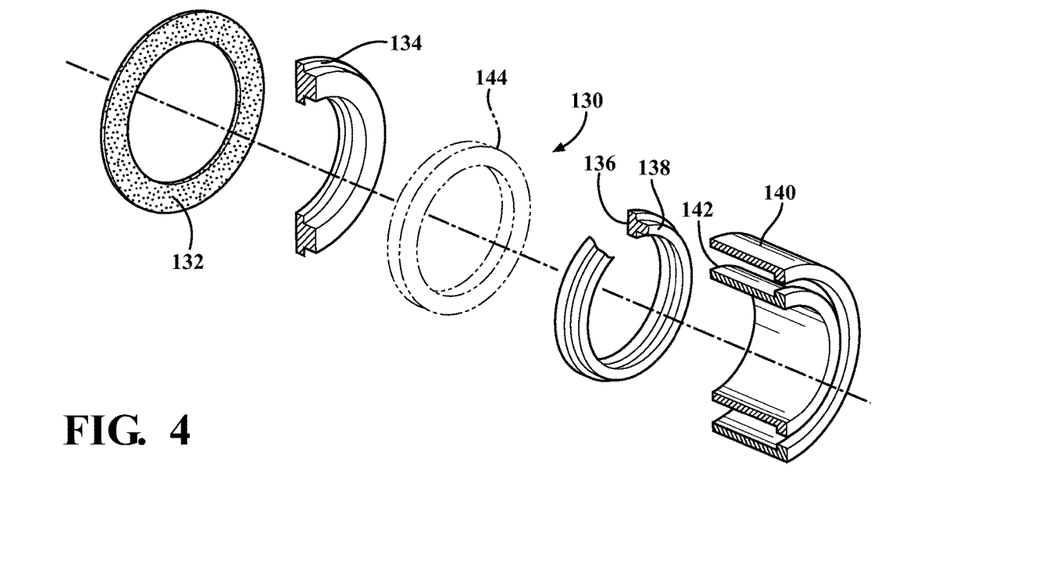
FIG. 4 is an exploded view of the dampening unit of FIG. 3.
Figure 5:
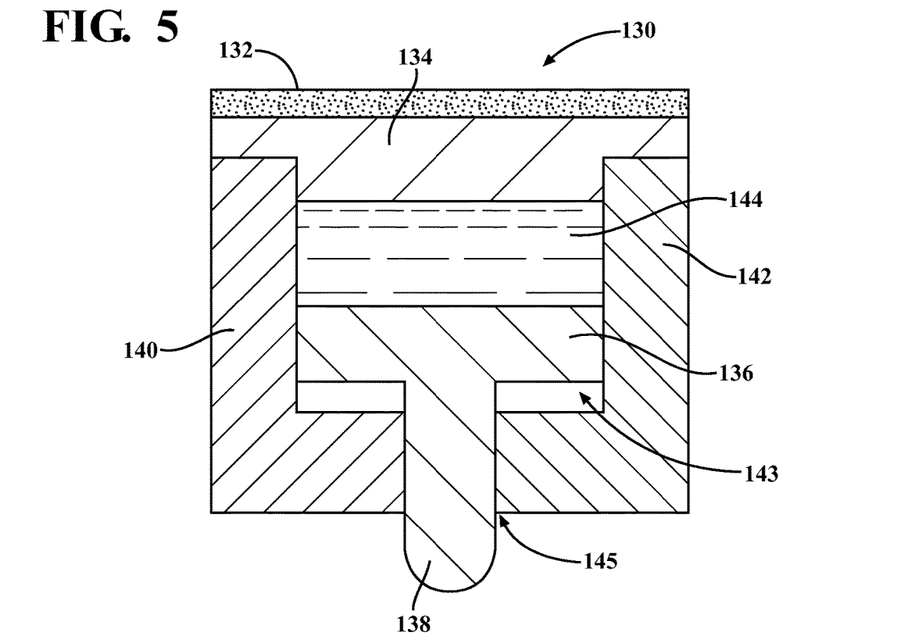
FIG. 5 is a cross-sectional view of a portion of the dampening unit of FIG. 3.

In one or more arrangements, the dampening unit 130 can be configured to be compressible. For instance, the dampening unit 130 can include a piston-based dampener. An example of such a dampening unit is shown in FIGS. 3-5. The dampening unit 130 can, for example, include a cap 134, a piston 136, a piston rod 138, an outer housing 140, and an inner housing 142. A fluid 144 can be contained within the outer housing 140, the inner housing 142, the piston 136, and the cap 134. An exploded view of these components is shown in FIG. 4. FIG. 5 shows a cross-sectional view of some arrangements of the dampening unit 130.

As stated earlier, an adhesive 132 can connect the dampening unit 130 to the underside 112 of the head 110 of the fastener 100. In one or more arrangements, the adhesive 132 can be positioned between and contact the underside 112 of the head 110 and the cap 134. The adhesive 132 can include any one or more types of adhesive configured to connect the dampening unit 130 to the head 110. For example, the adhesive 132 may include drying adhesives, pressure-sensitive adhesives, contact adhesives, and/or hot adhesives, just to name a few possibilities. The adhesive 132 can be natural and/or synthetic.

In one or more arrangements, the cap 134 can extend between both the outer housing 140 and the inner housing 142 (see, e.g., FIG. 5). The cap 134, the outer housing 140, and the inner housing 142 can collectively define a chamber 143 in which the piston 136 can operate. In one or more arrangements, at least a portion of the piston 136 can be configured to be positioned between the outer housing 140 and the inner housing 142. In one or more arrangements, the piston rod 138 can extend through a gap 145 defined between the outer housing 140 and the inner housing 142. Furthermore, in one or more arrangements, an outer piston housing (not shown) can be provided to cover the end of piston rod 138.

In one or more arrangements, a quantity of fluid 144 can be present between the cap 134, the outer housing 140, the inner housing 142, and the piston 136. As used herein, the term "fluid" can include any gas or liquid capable of being retained within the dampening unit 130. In one or more arrangements, the fluid can include a liquid. For example, the fluid can be water and/or an oil. In some arrangements, the fluid can be a gas. For instance, the gas can include air. In one or more arrangements, the fluid can be a compressible fluid. As the piston 136 moves toward the cap 134, the fluid can be compressed. Additionally, as the piston 136 is moved away from the cap 134, the fluid can decompress and fill in the expanding space between components.

In one or more arrangements, the dampening unit 130 can be a spring-based unit. One example of such a dampening unit 130 is shown in FIG. 6. The dampening unit 130 can include at least one spring 150 and a spring housing 152. As used herein, "spring" includes any elastic object configured to store mechanical energy. In one or more arrangements, the spring 150 can be a coil or helical spring. The spring 150 can be a compression spring, designed to operate under a compression load. The spring 150 can reduce in length as a compressive load is applied to it. In one or more arrangements, the spring 150 can be a coil spring that extends around a portion of the shaft 120. For example, the spring 150 can be coiled about an axis that is substantially aligned with a longitudinal axis of the shaft 120. The spring housing 152 can be formed from an elastomeric or other flexible material. The spring housing 152 can flex as the spring 150 is compressed and decompressed. The spring housing 152 can be solid or hollow. The spring housing 152 can have any suitable size, shape, and/or configuration.

In one or more arrangements, the spring-based dampening unit 130 can provide dampening characteristics based on the specifications of the spring 150. In one or more arrangements the dampening characteristics can include a force generated by the spring 150 in response to being compressed a certain distance. For example, the force generated by the spring 150 can be equal to the negative value of a spring constant multiplied by a distance compressed from an equilibrium state of the spring 150. The spring constant can depend at least upon the spring's material and/or construction. In one or more arrangements, the dampening characteristics of the dampening unit 130 can include the spring constant of the spring 150. The dampening characteristics can further include a displacement value representing an amount of displacement of the spring 150 under a particular compressive force.

In one or more arrangements, the fastener 100 can be used to operatively connect the first component 14 to the second component 20 such that target dampening characteristics are achieved between the first component 14 and the second component 20. As used herein, "target dampening characteristics" can include any desired dampening characteristics between components or within fastener 100. For example, the target dampening characteristics can be particular values, or ranges of values, of one or more dampening characteristics. The target dampening characteristics can be determined in any suitable manner. In one or more arrangements, the target dampening characteristics can be determined through physical and/or virtual testing. Physical testing can include operatively connecting components and evaluating NVH characteristics of the connection. Virtual testing can include computer aided engineering (CAE). For example, it can be determined, either through physical or virtual testing, that certain frequency of vibrations can be transferred between the first component 14 and the second component 20. Target dampening characteristics can be determined to reduce or prevent the transfer of vibrations. The fastener 100 can be used to operatively connect components to achieve the target dampening characteristics. In one or more arrangements, the target dampening characteristics can include a target resonance frequency between the first component 14 and the second component 20.

The dampening characteristics of the fastener 100 can be selectively variable. As used herein, "selectively variable" relates to any ability to select elements, features, or factors that are capable of change. For example, selectively variable dampening characteristics can include the ability to select from multiple dampening characteristics. In one or more arrangements, the dampening characteristics of the fastener 100 can be selectively variable based on an amount of torque applied to the head 110 of the fastener 100. For example, the dampening characteristics can be selectively variable based on the amount of compression that the dampening unit 130 is under. For a piston-based dampening unit 130, the dampening characteristics of the fastener 100 can be selectively variable based on the position of the piston 136. For a spring-based dampening unit 130, the dampening characteristics of the fastener 100 can be selectively variable based on the amount of compression the spring 150 is under. In one or more arrangements, the dampening unit 130 can be compressed as a torque is applied to the head 110. There can be a direct relationship between the amount of torque applied to the fastener 100 and the amount of compression of the dampening unit 130. For example, as more torque is applied, the dampening unit 130 can compress. As torque is removed, by loosening the fastener for example, the dampening unit 130 can decompress while still remaining in a state of compression.

Figures 7A, 7B, 7C:
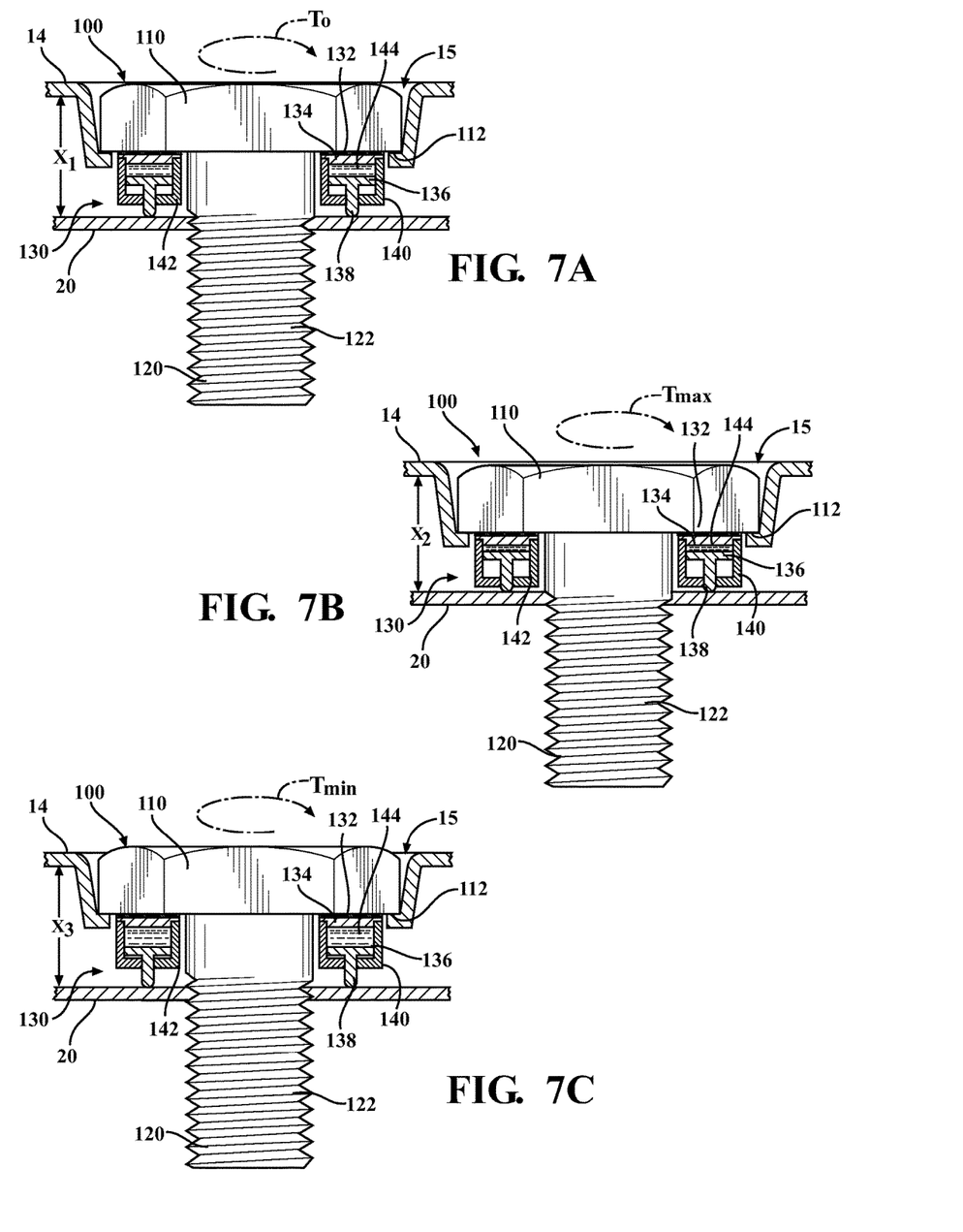
FIGS. 7A-7C are partial cross-sectional views of the fastener of FIG. 3, showing different torques applied to the fastener.
Figures 8A, 8B, 8C:
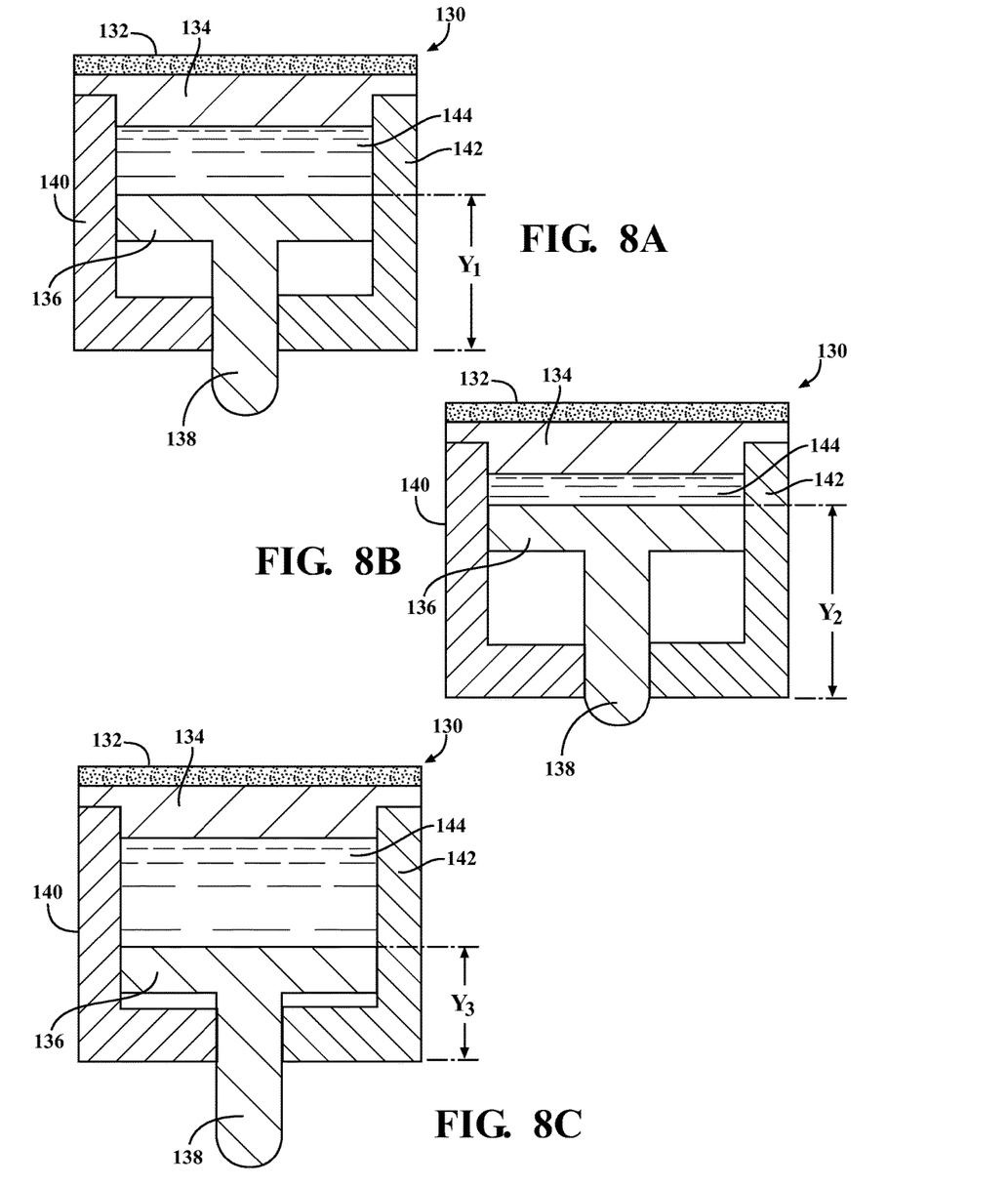
FIGS. 8A-8C are cross-sectional views of a portion of the variable dampening unit of the fastener of FIGS. 7A-7C.

FIGS. 7A-7C show examples of the fastener 100 under different levels of torque. FIGS. 8A-8C show examples of portions of the dampening unit 130 under the levels of torque corresponding to FIGS. 7A-C, respectively. In one or more arrangements, as the dampening unit 130 is compressed, the distance between the first component 14 and the second component can decrease.

An example torque level $T_0$ is applied to the fastener 100 in FIG. 7A. $T_0$ can represent any torque applied to the fastener 100 that is between a minimum and maximum allowable torque. In some arrangements, $T_0$ can be a default or standard torque setting. The torque $T_0$ can result in the piston 136 being compressed to a point where the distance between the first component 14 and the second component 20 is $X_1$. As shown in FIG. 8A, the piston 136 can be at a position $Y_1$ during the application of $T_0$.

FIG. 7B shows the fastener 100 being torqued to a level $T_{max}$. In one or more arrangements, $T_{max}$ can represent a maximum allowed torque for the fastener 100. As shown in FIG. 7B, the distance between the first component 14 and the second component 20 can be $X_2$. Based on $T_{max}$, the piston 136 can be compressed a maximum amount. As shown in FIG. 8B, the piston 136 can be at a position Y2. In one or more arrangements, Y2 can be greater during Tmax, as the dampening unit 130 is compressed further under a higher torque application.

FIG. 7C shows the fastener 100 being torqued to a level $T_{min}$. In one or more arrangements, $T_{min}$ can represent a minimum allowed torque for the fastener 100. As shown in FIG. 7C, the distance between the first component 14 and the second component 20 can be $X_3$. Based on $T_{min}$, the piston 136 can be compressed a minimum amount. As shown in FIG. 8C, the piston 136 can be at a position $Y_3$. In one or more arrangements, $Y_3$ during $T_{min}$ can be less than Y1 at $T_0$, as the dampening unit 130 is not compressed as far during an application of a lesser torque.

Figure 2:
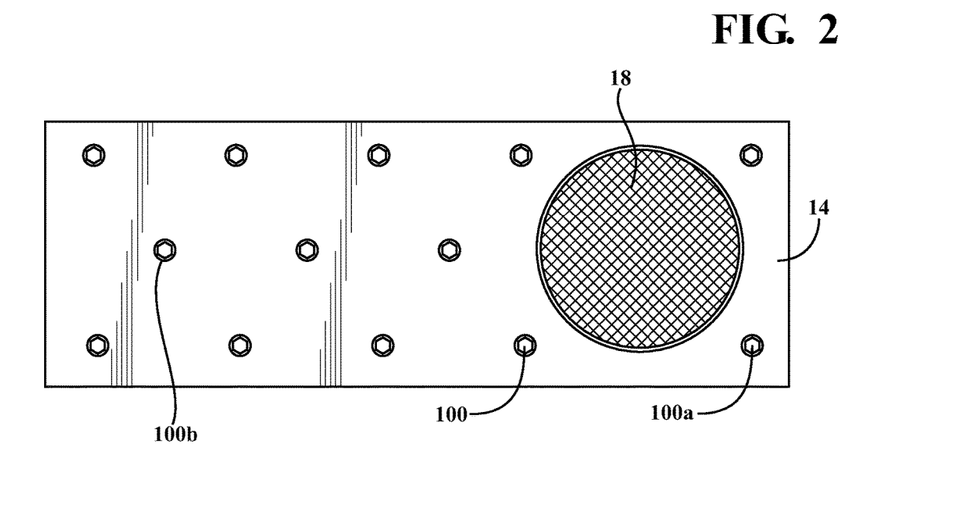
FIG. 2 is an example of an interior trim panel, showing a plurality of fasteners connecting two or more components.

In one or more arrangements, the first component 14 can be operatively connected to the second component 20 using a plurality of fasteners 100. For example, as shown in FIGS. 1 and 2, a plurality of fasteners 100 are used to operatively connect the first component 14 (trim panel) to the second component 20. The arrangements described herein can allow for different dampening characteristics to be provided at different attachment locations. For example, one of the fasteners 100a can operatively connect the first component 14 to the second component 20 at an attachment location near the speaker 18. Another one of the fasteners 100b can operatively connect the first component 14 to the second component 20 at an attachment location at a greater distance away from the speaker 18 than the fastener 100a. The target dampening characteristics can be different at different attachment locations. For instance, greater dampening can be desired at the attachment location of fastener 100a due to the proximity of vibrating speaker 18. Additionally, less dampening and greater stiffness can be desired at the attachment location of fastener 100b. These and other dampening characteristics can be achieved by selectively adjusting the amount of torque applied to the fasteners 100a and 100b.

In one or more arrangements, the dampening characteristics of the fastener 100 can be selectively varied at any suitable point in time. For instance, the dampening characteristics of the fastener 100 can be selectively varied subsequent to the initial operative connection of the first component 14 and the second component 20. For example, a first torque can be applied to the fastener 100 to operatively connect the components. It can subsequently be determined that different dampening characteristics of the fastener 100 are desired. Accordingly, a second torque can be applied to the fastener 100 to achieve the desired dampening characteristics.

Figure 9:
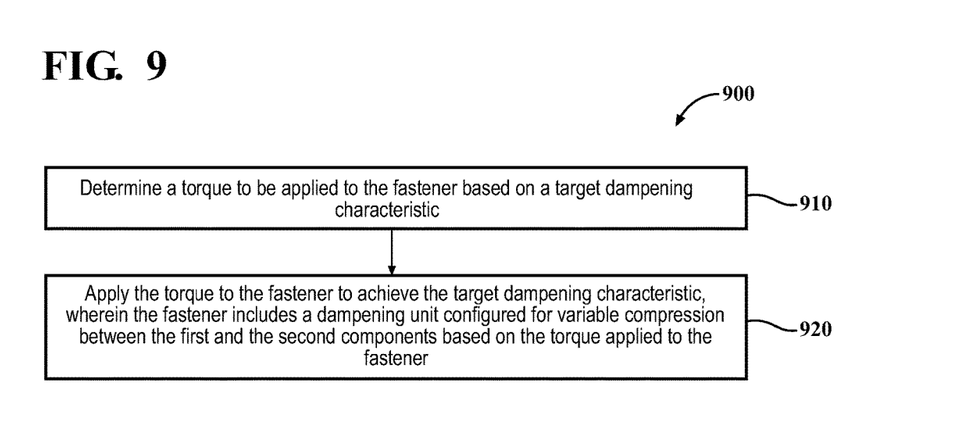
FIG. 9 is an example of a method for applying torque to a fastener to achieve target dampening characteristics.

Now that various potential elements and/or components have been described, various methods for achieving target dampening characteristics will now be described. Referring to FIG. 9, one example of a method 900 for achieving target dampening characteristics between two components is shown, and various possible steps for the method 900 will now be described. The method 900 can be applicable to the arrangements described herein and in the Figures, but it is to be understood that the method 900 can be carried out with other suitable systems. Additionally, the method 900 can include other steps that are not shown here, and the method 900 is not limited to including every step shown in FIG. 9. The steps that are illustrated here as part of the method 900 are not limited to this particular chronological order. Indeed, some of the steps can be performed in a different order than what is shown and/or at least some of the steps shown can occur simultaneously.

At block 910, a torque to be applied to the fastener can be determined. The determination can be made in any suitable manner. The determination can be based on a target dampening characteristic. The dampening characteristics can be expressed as any suitable quantitative or qualitative measurement. For example, the target dampening characteristic can include a force required to move the first component relative to the second component a predetermined distance. The target dampening characteristic can also include the reduction or prevention of the transfer of a particular vibration or sound from one of the first or second components to the other. In one or more arrangements, the target dampening characteristics can include a resonance frequency between the two components. The method 900 can continue to block 920.

At block 920, the determined torque can be applied to the fastener to achieve the target dampening characteristics. The fastener can include a dampening unit configured for variable compression between the first and second components based on the torque applied to the fastener. For example, the dampening unit 130 of the fastener 100 can be compressed to achieve the target dampening characteristics between the first and second components.

Figure 10:
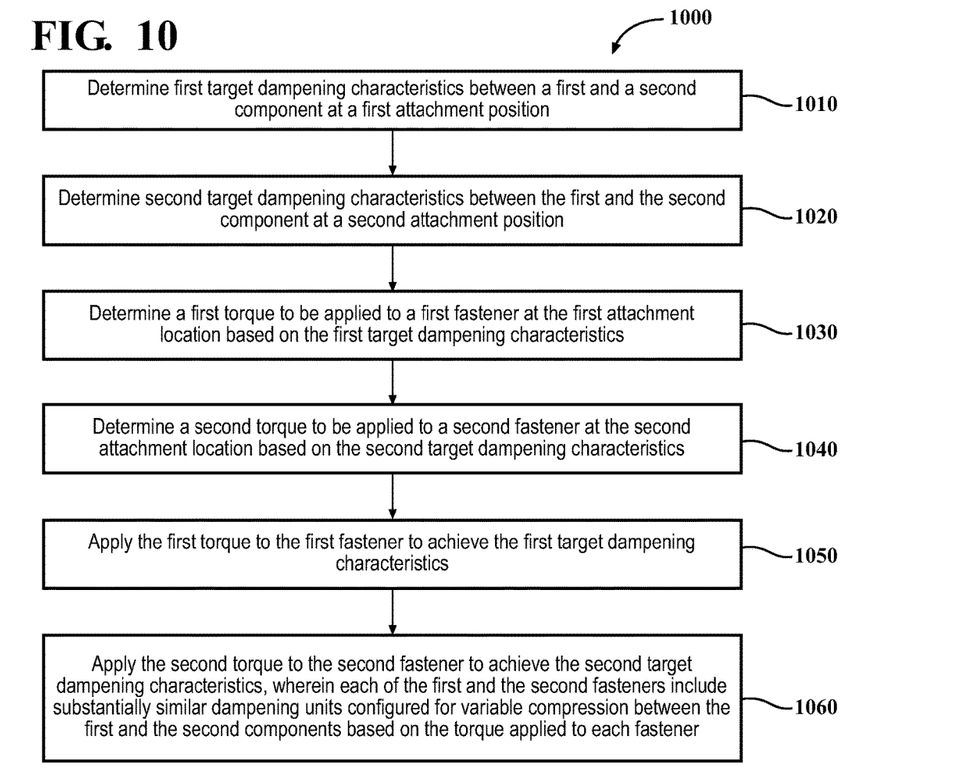
FIG. 10 is an example of a method for applying first and second torques at first and second attachment locations.

Referring to FIG. 10, an example of a method 1000 for operatively connecting two components using two or more fasteners configured to provide variable dampening characteristics is shown confirming connections is shown, and various possible steps for the method 1000 will now be described. The method 1000 can be applicable to the arrangements described herein and in the Figures, but it is to be understood that the method 1000 can be carried out with other suitable systems. Additionally, the method 1000 can include other steps that are not shown here, and the method 1000 is not limited to including every step shown in FIG. 10. The steps that are illustrated here as part of the method 1000 are not limited to this particular chronological order. Indeed, some of the steps can be performed in a different order than what is shown and/or at least some of the steps shown can occur simultaneously.

At block 1010, first target dampening characteristics between a first component and a second component at a first attachment location can be determined. At block 1020, second target dampening characteristics between the first component and the second component at a second attachment location can be determined.

At block 1030, a first torque to be applied to a first fastener at the first attachment location can be determined based on the first target dampening characteristics. At block 1040, a second torque to be applied to a second fastener at the second attachment location can be determined based on the second target dampening characteristics.

At block 1050, the first torque can be applied to the first fastener to achieve the first target dampening characteristics at the first attachment location. At block 1060, the second torque can be applied to the second fastener to achieve the second target dampening characteristics at the second attachment location. In one or more arrangements, each of the first and second fasteners include substantially similar dampening units configured for variable compression between the first and the second components based on the torque applied to each fastener.

It will be appreciated that arrangements described herein can provide numerous benefits, including one or more of the benefits mentioned herein. For example, arrangements described herein can allow for a common fastener to be used to provide different dampening characteristics based on target dampening characteristics for a particular application. For instance, for the operative connection of a first component to a second component, it may be desirable to have a firm connection that may be achieved by applying more torque to a fastener. Additionally, the components and methods described can allow a fastener to change the local dampening characteristics by changing the torque applied to the fastener. For example, if it is determined a particular connection between components is too firm and vibrations are being transferred too easily, the fastener can be loosened to a lower torque value. Furthermore, different fasteners that connect one or more common components can be torqued to different levels to provide different target dampening characteristics. Thus, the dampening of a particular component can be "tuned" based on the particular forces acting on the component, and the frequency response of the component.

The flowcharts and block diagrams in the figures illustrate the architecture, functionality, and operation of possible implementations of systems and methods according to various embodiments. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending on the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and can be used in combination with any other example, embodiment, implementation, aspect, feature, or element.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein can include sequences or series of steps or stages, elements of the methods disclosed herein can occur in various orders or concurrently. Additionally, elements of the methods disclosed herein can occur with other elements not explicitly presented and described herein. Furthermore, not all elements of the methods described herein can be required to implement a method in accordance with this disclosure. Although aspects, features, and elements are described herein in particular combinations, each aspect, feature, or element can be used independently or in various combinations with or without other aspects, features, and elements.

Although features can be described above or claimed as acting in certain combinations, one or more features of a combination can in some cases be excised from the combination, and the combination can be directed to a subcombination or variation of a sub-combination.

The above-described aspects, examples, and implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A fastener configured to operatively connect a first component and a second component, comprising:
   a head;
   a shaft extending from an underside of the head; and
   a dampening unit positioned in connection with the underside of the head, the dampening unit comprising:

an inner housing having an inner flange;

an outer housing having an outer flange, the inner flange and the outer flange facing each other;

a piston fluidly connected to the head; and a piston rod extending from the piston and between the inner flange and the outer flange, the dampening unit being operatively connected to the head, the dampening unit configured to compress between the head and the second component.

2. The fastener of claim 1, wherein the dampening unit is substantially annular and extends around at least a portion of the shaft.

3. The fastener of claim 1, wherein an amount of compression of the dampening unit is based on an amount of torque applied to the head.

4. The fastener of claim 1, wherein the dampening unit is selectively variably compressible between a minimum torque and a maximum torque applied to the head.

5. The fastener of claim 1, wherein the dampening unit is connected to the head.

6. A fastener configured to operatively connect a first component and a second component, comprising:

a head;

a shaft extending from an underside of the head, the shaft comprising a threaded portion and an unthreaded portion; and a dampening unit, the dampening unit comprising:

an inner housing having an inner flange;

an outer housing having an outer flange, the inner flange and the outer flange facing each other;

a piston fluidly connected to the head; and a piston rod extending from the piston and between the inner flange and the outer flange, the dampening unit being operatively connected to the head and resting around the unthreaded portion, the dampening unit configured to compress between the head and the second component.

7. The fastener of claim 6, wherein an amount of compression of the dampening unit is based on an amount of torque applied to the head.

8. The fastener of claim 6, wherein the dampening unit is selectively variably compressible between a minimum torque and a maximum torque applied to the head.

9. The fastener of claim 6, wherein the dampening unit is connected to the head.

10. A vehicle, comprising:

a first component;

a second component; and a fastener connecting the first component and the second component, the fastener comprising:

a head;

a shaft extending from an underside of the head; and a dampening unit between the underside of the head and the second component, the dampening unit comprising:

an inner housing having an inner flange;

an outer housing having an outer flange, the inner flange and the outer flange facing each other;

a piston fluidly connected to the head; and a piston rod extending from the piston and between the inner flange and the outer flange, the dampening unit being operatively connected to the head and resting around the shaft, the dampening unit configured to compress between the head and the second component, the dampening unit separating the first component from the second component.

* * * * *